(12) United States Patent
Azeem et al.

(10) Patent No.: US 9,429,477 B2
(45) Date of Patent: Aug. 30, 2016

(54) METHOD AND SYSTEM FOR MONITORING THE PERFORMANCE OF A HEAT EXCHANGER

(71) Applicant: ROLLS-ROYCE PLC, London (GB)

(72) Inventors: Waqar Azeem, Derby (GB); Mark Peden Reid, Derby (GB)

(73) Assignee: ROLLS-ROYCE PLC, London (GB)

( * ) Notice: Subject to any disclaimer, the term of this patent is extended or adjusted under 35 U.S.C. 154(b) by 319 days.

(21) Appl. No.: 14/225,112

(22) Filed: Mar. 25, 2014

(65) Prior Publication Data

US 2014/0341256 A1    Nov. 20, 2014

(30) Foreign Application Priority Data

May 15, 2013  (GB) .................................. 1308709.3

(51) Int. Cl.

| F28F 27/00 | (2006.01) |
|---|---|
| F28D 21/00 | (2006.01) |
| G01K 1/16 | (2006.01) |
| F02C 7/14 | (2006.01) |

(52) U.S. Cl.
CPC . *G01K 1/16* (2013.01); *F02C 7/14* (2013.01); *F28F 27/00* (2013.01); *F05D 2260/80* (2013.01); *F28D 2021/0021* (2013.01); *Y02T 50/675* (2013.01)

(58) Field of Classification Search
CPC ...................................................... F28F 27/00
See application file for complete search history.

(56) References Cited

U.S. PATENT DOCUMENTS

| 4,498,525 A * | 2/1985 | Smith ....................... F02C 7/14 123/552 |
|---|---|---|
| 5,152,146 A | 10/1992 | Butler |
| 5,714,685 A * | 2/1998 | Hobro ..................... A61M 1/16 165/11.1 |
| 6,318,089 B1 * | 11/2001 | Hiraga .................... F01D 25/32 165/297 |

(Continued)

FOREIGN PATENT DOCUMENTS

| CN | 102829991 A | 12/2012 |
|---|---|---|
| EP | 2 105 081 A2 | 9/2009 |

(Continued)

OTHER PUBLICATIONS

European Search Report issued in European Patent Application No. 14 16 1534 on Sep. 9, 2014.

(Continued)

*Primary Examiner* — Robert Huber
*Assistant Examiner* — Anthony W Megna Fuentes
(74) *Attorney, Agent, or Firm* — Oliff PLC

(57) ABSTRACT

A system for monitoring the performance of a fluid heat exchanger for use with an engine includes a heat exchanger having a first fluid flow path therethrough and a second fluid flow path therethrough, a first temperature sensor positioned in the first fluid flow path at an exit from the heat exchanger, a second temperature sensor positioned in the second fluid flow path at an entry to the heat exchanger, a processor and an alert generator. The processor is adapted to receive a first temperature measurement value from the first temperature sensor, and a second temperature measurement value from the second temperature sensor, the processor being further adapted to calculate a temperature difference between the first and second temperature measurement values. The alert generator is adapted to generate an alert signal to a user, the alert signal being generated if the temperature difference is greater than a threshold value.

14 Claims, 4 Drawing Sheets

(56) References Cited

U.S. PATENT DOCUMENTS

| | | | | |
|---|---|---|---|---|
| 7,966,868 | B1* | 6/2011 | Sonnichsen | F01D 25/285 73/112.01 |
| 8,199,313 | B2* | 6/2012 | Okada | F28F 27/00 355/30 |
| 2003/0075314 | A1* | 4/2003 | Cryer | B60H 1/00792 165/254 |
| 2006/0005554 | A1* | 1/2006 | Okada | F24F 11/008 62/183 |
| 2012/0085528 | A1* | 4/2012 | Schwarz | F01D 25/08 165/287 |
| 2015/0047377 | A1* | 2/2015 | Hamasaki | F25B 9/145 62/115 |

FOREIGN PATENT DOCUMENTS

| | | |
|---|---|---|
| JP | A-2005-256447 | 9/2005 |
| JP | A-2010-91181 | 4/2010 |

OTHER PUBLICATIONS

Nov. 12, 2013 Search Report issued in British Application No. GB1308709.3.

\* cited by examiner

Simplified Oil and Fuel System Schematics for an existing engine

METHOD AND SYSTEM FOR MONITORING THE PERFORMANCE OF A HEAT EXCHANGER

This invention claims the benefit of UK Patent Application No. 1308709.3, filed on 15 May 2013, which is hereby incorporated herein in its entirety.

FIELD OF THE INVENTION

The present invention relates to a method and system for monitoring the performance of a fluid heat exchanger, and particularly, but not exclusively to a method and system for monitoring the performance of a fluid heat exchanger of a gas turbine engine.

BACKGROUND TO THE INVENTION

In a typical aircraft engine fuel system architecture the fuel supplied to the engine(s) from the airplane's fuel tank(s) by a low pressure pump that is located upstream of a fuel-to-oil heat exchanger. The fuel-to-oil heat exchanger is the main heat sink for the engine oil and provides for both oil cooling and fuel heating.

In such an engine design it is usual to incorporate a bypass flow path providing an alternate flow path for the fuel in the unlikely event that the fuel-to-oil heat exchanger becomes blocked. A typical such engine arrangement is shown schematically in FIG. 1.

Clearly, the engine fuel system must provide the engine with the demanded fuel flow at all operating conditions. The fuel-to-oil heat exchanger bypass arrangement enables this condition to be maintained in the unlikely event that blockage of the fuel-to-oil heat exchanger occurs.

However, even a partial blockage of the fuel-to-oil heat exchanger may result in diminished oil cooling and fuel heating with the performance of both the oil and fuel system deviating from nominal levels for the operating condition of the engine.

It is highly desirable to be able to monitor the on wing health and performance of fuel-to-oil heat exchangers so that the requirement for maintenance action can be forecasted, and/or mitigation action may be taken.

STATEMENTS OF INVENTION

According to a first aspect of the present invention there is provided a method of monitoring the performance of a fluid heat exchanger for use with an engine, the heat exchanger comprising a first fluid flow path therethrough, and a second fluid flow path therethrough, the method comprising the steps of:
  a) measuring a first temperature of a first fluid flowing through the first fluid flow path at an exit from the heat exchanger;
  b) measuring a second temperature of a second fluid flowing through the second fluid flow path at an entry to the heat exchanger;
  c) determining for the first and second temperature measurements, a temperature difference therebetween;
  d) comparing the temperature difference to a first threshold value indicative of a complete blockage of the first fluid flow path through the heat exchanger; and
  e) if the temperature difference is greater than the first threshold value, generating a first alert signal to indicate a deterioration in the heat exchanger performance.

The invention provides a method of detecting a change in the fuel-to-oil heat exchanger performance which may be caused by blockage, or other deviation in normal operation of the fuel-to-oil heat exchanger.

This is achieved by a method that uses existing temperature measurements at key locations within the oil and fuel system and the application of suitable software.

The method detects the change in fuel-to-oil heat exchanger performance due to blockage, when the blockage of the fuel-to-oil heat exchanger is close to bypass occurring or bypass has occurred.

Optionally, the engine is a gas turbine engine.

In one embodiment of the invention, the engine is a gas turbine engine installed in an aircraft application. Alternatively, the gas turbine engine may be installed, for example, in a marine or stationary power generating application.

In other embodiments, the engine may be an alternative internal combustion engine such as, for example, a diesel engine.

Optionally, the first fluid flow path is a fuel flow path to the engine.

Alternatively, the first fluid flow path may be another flow path associated with an operating fluid of the engine, such as, for example, a fuel return line or a fuel bypass line.

Optionally, the second fluid flow path is an oil flow path to the engine.

In an alternative arrangement, the second fluid flow path may be another flow path associated with an operating fluid of the engine, such as, for example, an oil return line, an oil bypass line, or a coolant flow line.

Optionally, the first threshold value is determined as a function of one or more of engine shaft speed, oil flow rate, fuel flow rate, gas path pressure, gas path temperature, engine thrust, and weight of fuel flowing to the engine.

The deviation in performance of the fuel-to-oil heat exchanger is related to that expected for an engine operating condition which requires characterisation of the nominal performance relative to engine operating conditions which is attributed to be a key parameter in engine heat generation or cooling capability of the fuel-to-oil heat exchanger.

The first threshold value is determined to be representative of a desired engine operating condition. The first threshold value may be a fixed value or limit, for example if the engine is operating at a constant speed and load condition.

Alternatively, the first threshold value may vary with the engine speed for an application in which the engine operating regime is known. This provides for an optimum value of the first threshold value for any given engine speed.

In a further alternative, the first threshold value may vary both with engine speed and also with one or more other engine operating parameters such as, for example, engine shaft speed, oil flow rate, fuel flow rate, gas path pressure, gas path temperature, engine thrust, and weight of fuel flowing to the engine. This provides for an optimum value of the first threshold value for any given engine speed and load.

Optionally, step d) comprises the step of:
  d') comparing the temperature difference to a second threshold value indicative of a partial blockage of the first fluid flow path through the heat exchanger;
  and step e) comprises the step of:
  e') if the temperature difference is greater than the second threshold value, generating a second alert signal to indicate a deterioration in the heat exchanger performance.

The use of a second threshold value that is arranged to provide an indication of a partial blockage in the first fluid flow path enables preventative action to be taken to remedy the cause of the partial blockage before a complete blockage ensues with the attendant loss of engine performance together with increased maintenance and repair costs. This makes the present invention more convenient and cost effective for a user.

Optionally, the second threshold value is determined as a function of one or more of engine shaft speed, oil flow rate, fuel flow rate, gas path pressure, gas path temperature, engine thrust, and weight of fuel flowing to the engine.

The second threshold value may be a single, fixed value or may vary as a function of engine speed and/or other engine parameters, as described above in respect of the first threshold value.

According to a second aspect of the present invention there is provided a system for monitoring the performance of a fluid heat exchanger for use with an engine, the heat exchanger comprising a first fluid flow path therethrough and a second fluid flow path therethrough, the system comprising:

a first temperature sensor positioned in the first fluid flow path at an exit from the heat exchanger;
a second temperature sensor positioned in the second fluid flow path at an entry to the heat exchanger;
a processor adapted to receive a first temperature measurement value from the first temperature sensor, and a second temperature measurement value from the second temperature sensor, the processor being further adapted to calculate a temperature difference between the first and second temperature measurement values; and
an alert generator adapted to generate an alert signal to a user, the alert signal being generated if the temperature difference is greater than a threshold value.

The measurement of the first and second temperatures may be achieved using existing temperature sensors that are commonly employed in engine fuel systems. Furthermore, the step of determining a temperature difference between the first and second temperature measurements may be undertaken by the existing Engine Control Unit with minimal processing overhead. Consequently, the system of the present invention requires no additional hardware and therefore imposes no weight burden and virtually no cost increase to the engine installation.

Optionally, the engine is a gas turbine engine.

Optionally, wherein the first fluid flow path is a fuel flow path to the engine.

Optionally, the second fluid flow path is an oil flow path to the engine.

Optionally, the threshold value is a first threshold value indicative of a complete blockage of the first fluid flow path through the heat exchanger, the first threshold value being determined as a function of one or more of engine shaft speed, oil flow rate, fuel flow rate, gas path pressure, gas path temperature, engine thrust, and weight of fuel flowing to the engine.

Optionally, wherein the threshold value is a second threshold value indicative of a partial blockage of the first fluid flow path through the heat exchanger, the second threshold value being determined as a function of one or more of engine shaft speed, oil flow rate, fuel flow rate, gas path pressure, gas path temperature, engine thrust, and weight of fuel flowing to the engine.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
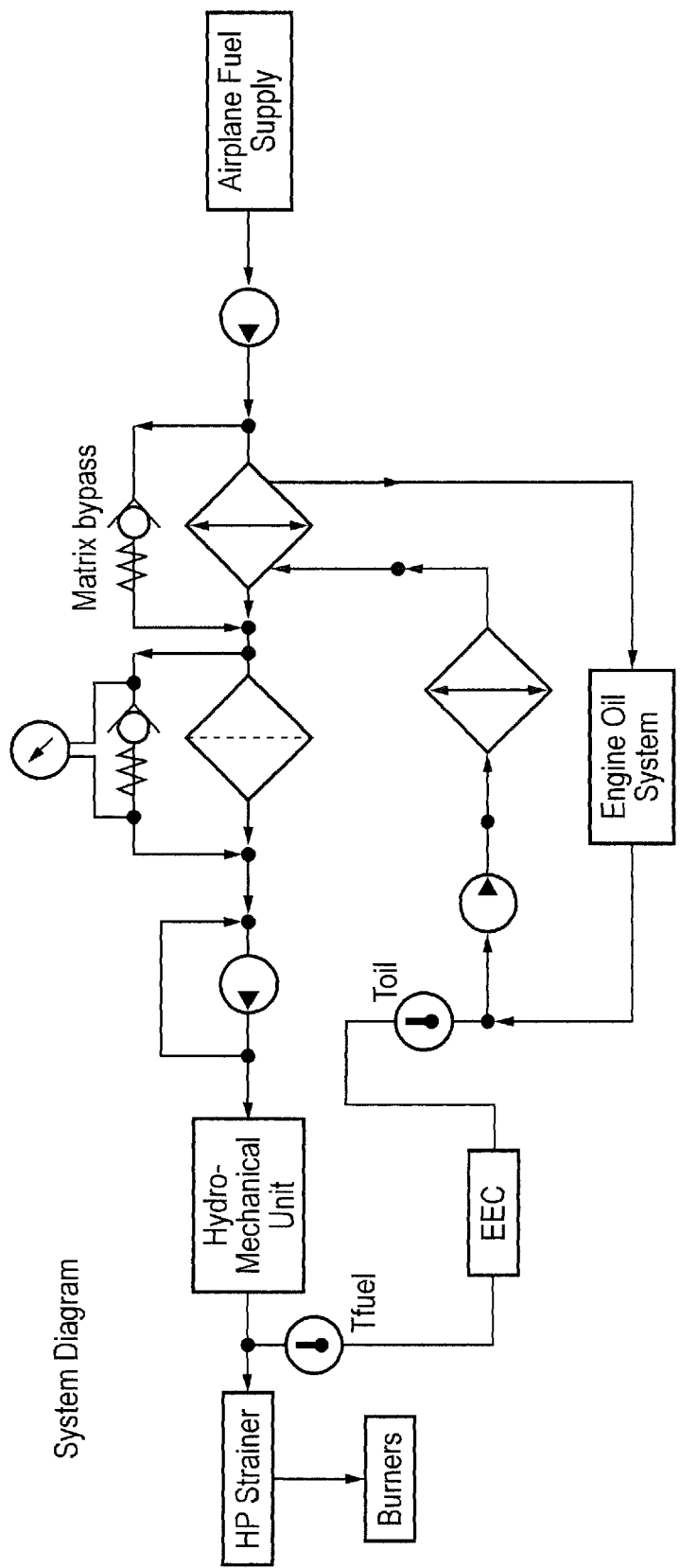
FIG. 1 shows a schematic arrangement of part of the oil and fuel system for a typical aircraft gas turbine engine installation.
Figure 2:
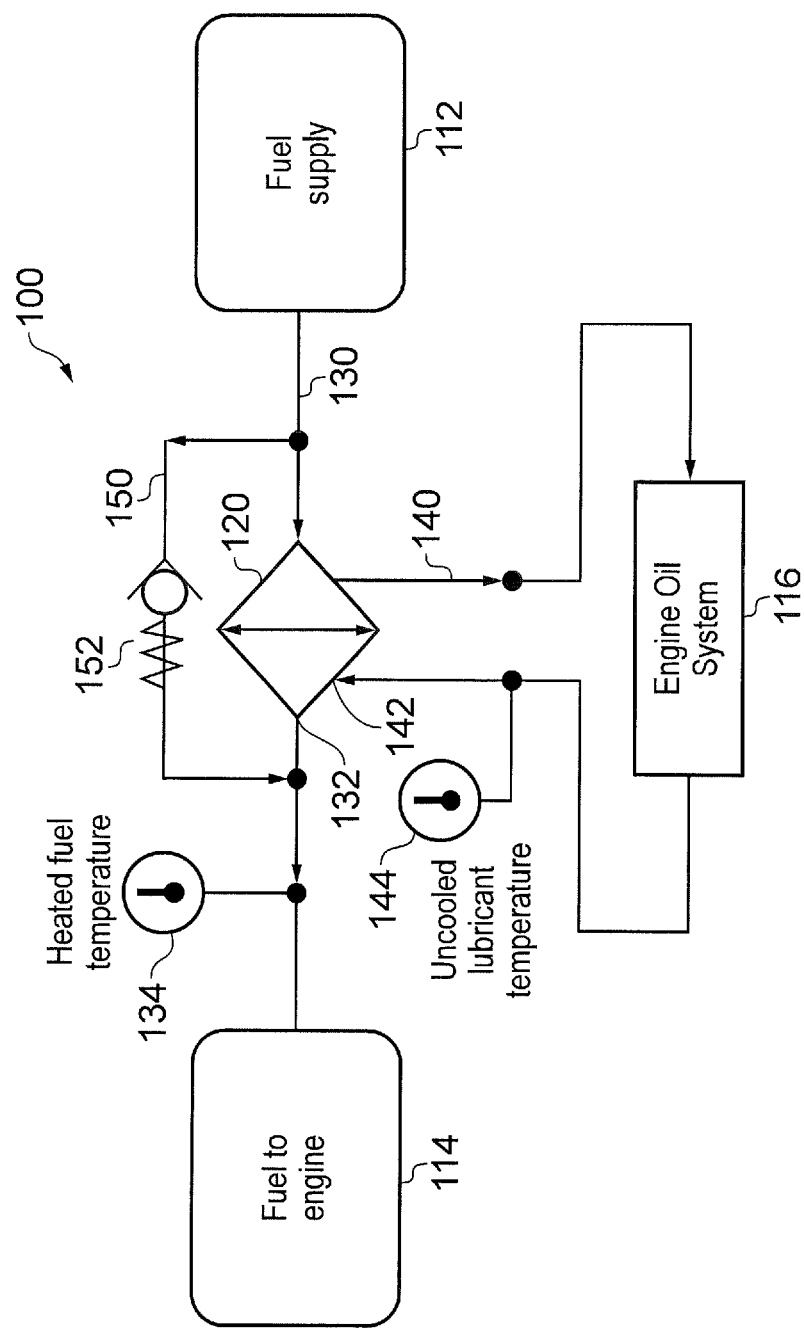
FIG. 2 shows a schematic arrangement of a system according to the present invention.
Figure 3:
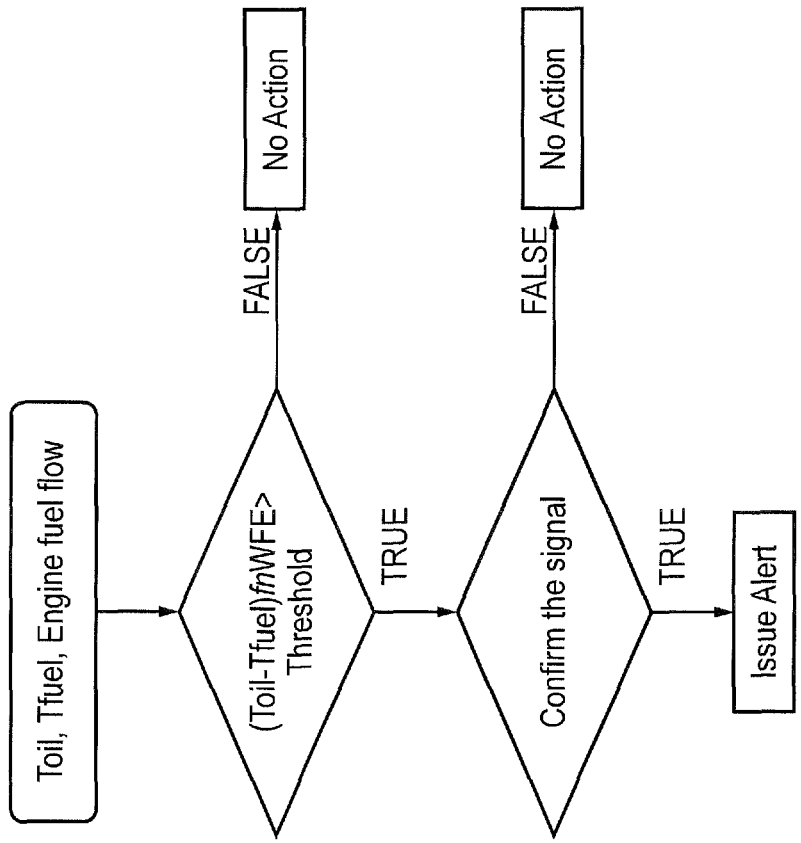
FIG. 3 shows a flowchart illustrating the method of the present invention.

Referring to FIGS. 2 and 3, a system for monitoring the performance of a fluid heat exchanger according to a first embodiment of the invention is designated generally by the reference numeral 100.

The system 100 comprises a fuel reservoir 112, an oil system 116 and a heat exchanger 120.

The heat exchanger 120 comprises a first fluid flow path 130 extending through the heat exchanger 120 and a second fluid flow path 140 extending through the heat exchanger 120.

In the present embodiment the first fluid flow path 130 and the second fluid flow path 140 are arranged in a cross-flow orientation within the heat exchanger 120. In other arrangements, the first fluid flow path 130 and the second fluid flow path 140 may take other orientations relative to one another.

A first temperature sensor 134 is positioned in the first fluid flow path 130 at the exit from the heat exchanger 120. A second temperature sensor 144 is positioned in the second fluid flow path 130 at the entry to the heat exchanger 120. In the present embodiment the first and second temperature sensors 134, 144 form part of the existing sensor suite of the engine.

A bypass path 150 is provided in the first fluid flow path 130 around the heat exchanger 120. The bypass path 150 includes a non-return valve 152 that ensures that fuel passes through the heat exchanger 120 only once.

In use, a first temperature is measured by the first temperature sensor 134 and a second temperature 144 is measured by the second temperature sensor 144. These temperatures values are passed to the Engine Control Unit (not shown) in which a temperature difference is calculated for each respective pair of first and second temperature measurements.

The calculated temperature difference is then compared to each of a first threshold value and a second threshold value (see the flowchart of FIG. 3).

The first threshold value and the second threshold value represent expected temperature difference values corresponding to complete and partial blockage of the first fluid flow path 130 through the heat exchanger 120. The first threshold value and the second threshold value are pre-determined based on the nominal fuel-to-oil heat exchanger performance and an analysis of the resultant performance of the fuel-to-oil heat exchanger due to blockage for a range of engine operating conditions.

In the present embodiment, the first temperature corresponds to the combined scavenge oil temperature and the second temperature corresponds to the fuel temperature downstream of a hydro-mechanical unit that supplies the fuel to the engine.

The nominal fuel-to-oil heat exchanger performance is determined from the operating parameters of the engine, for example, shaft speed(s), oil or fuel flow rates, gas path pressure(s) or temperature(s), or engine thrust. In the present embodiment the first threshold value and the second threshold value are determined as a function of the weight of the engine demanded fuel flow.

A calculated temperature difference exceeding either of the first threshold value and the second threshold value indicates a deterioration in fuel-to-oil heat exchanger performance from the nominal. Consequently, if the calculated temperature difference exceeds either of the first threshold value and the second threshold value, an alert generator within the Engine Control Unit generates a respective alert signal which is passed to a user.

In an aircraft application, the user is a member of the aircraft's flight crew. The user may then, in response to the alert signal take the necessary remedial action.

In the embodiment of FIG. 2, the first temperature is the temperature of the fuel at the exit of the first fluid flow path 130 from the heat exchanger 120, while the second temperature is the temperature of the oil at the entry to the first fluid flow path 130 into the heat exchanger 120.

Alternatively, the method of the invention may be implemented with various alternative temperature measurements and measurement location points for the first temperature and the second temperature.

Figure 4:
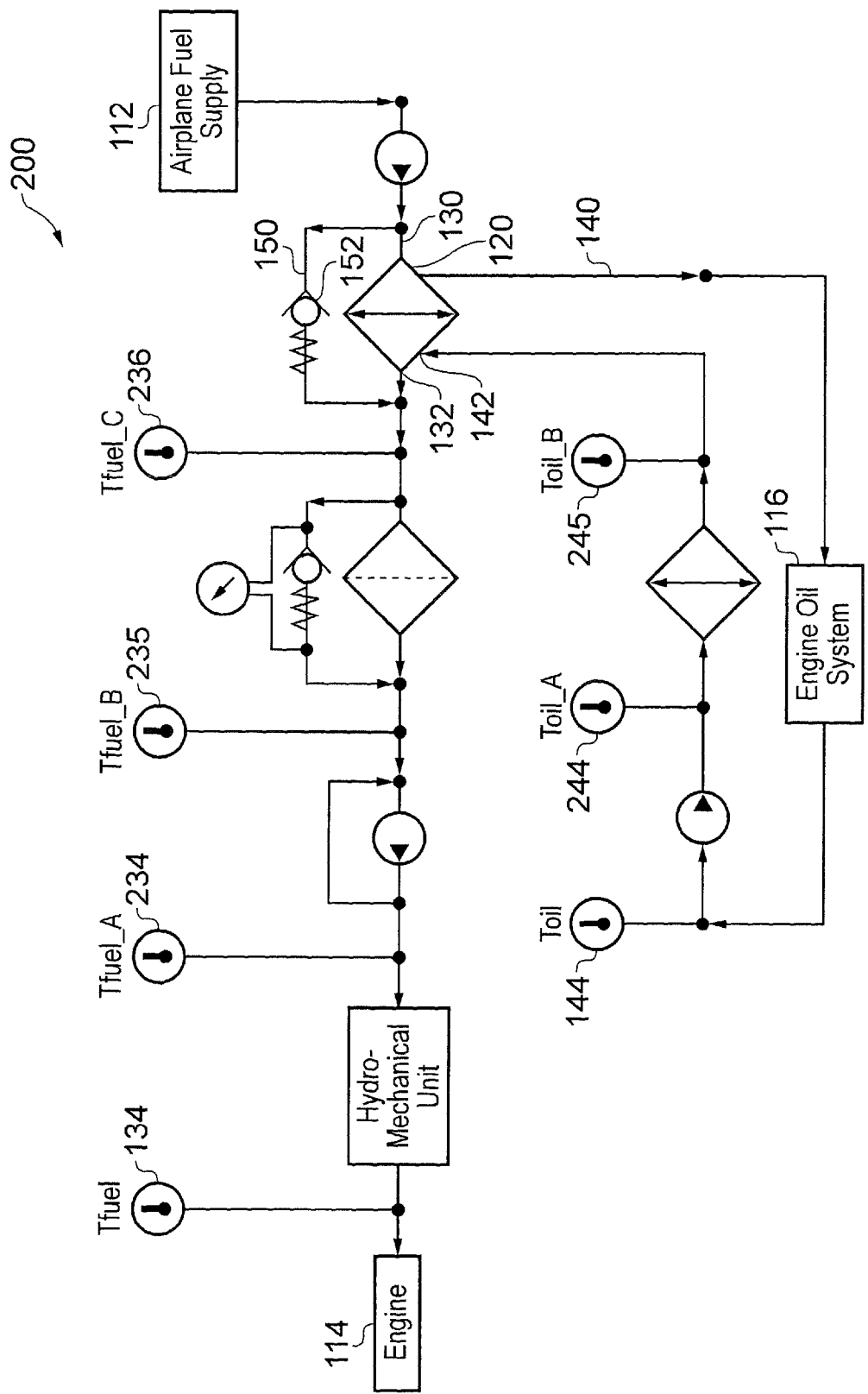
FIG. 4 shows a schematic arrangement of a part of the oil and fuel system for an aircraft gas turbine engine installation according to the present invention, showing possible alternative locations for fluid temperature measurements.

FIG. 4 illustrates a number of such alternative arrangements that are detailed below.

Direct measurement of fuel temperature difference where the first temperature is the temperature of the airplane fuel supply 112, and the second temperature is the fuel temperature (Tfuel_C) 236 at the exit of the first fluid flow path 130 from the heat exchanger 120.

Direct measurement of the oil temperature difference where the first temperature is Toil_A 244, and the second temperature is Toil_B 245.

Indirect measurement of fuel temperature difference where the first temperature is the temperature of the airplane fuel supply 112, and the second temperature is one of the fuel temperatures 235, 234, 134 downstream of the exit of the first fluid flow path 130 from the heat exchanger 120.

Indirect measurement of the oil temperature difference where the first temperature is Toil 144, and the second temperature is Toil_B 245.

Measurement of the temperature difference between the oil and fuel where the first temperature is Toil_A 244, and the second temperature is the temperature of the airplane fuel supply 112.

Indirect measurement of the temperature difference between the oil and fuel where the first temperature is Toil 144 or Toil_A 244 or Toil_B 245, and the second temperature is one of the fuel temperatures 236, 235, 234, 134 downstream of the exit of the first fluid flow path 130 from the heat exchanger 120.

Referring to FIG. 3, a system for monitoring the performance of a fluid heat exchanger according to a second embodiment of the invention is designated generally by the reference numeral 200. Features of the system 200 which correspond to those of apparatus 100 have been given corresponding reference numerals for ease of reference.

The system 200 comprises a fuel reservoir 112, an oil system 116 and a heat exchanger 120.

The heat exchanger 120 comprises a first fluid flow path 130 extending through the heat exchanger 120 and a second fluid flow path 140 extending through the heat exchanger 120.

A bypass path 150 is provided in the first fluid flow path 130 around the heat exchanger 120. The bypass path 150 includes a non-return valve 152 that ensures that fuel passes through the heat exchanger 120 only once.

This method and system of the present invention may be applied to other gas turbine engine applications (aero/marine/industrial) using fuel-to-oil heat exchanger as the oil heat sink, or other heat exchanger types and applications where the invention can be applied to a system which uses fluid other than fuel to cool the engine lubrication system. If the temperature difference (an indication of heat when flow is measured or can be derived from engine operating condition by understanding of the system) between the coolant and the fluid being cooled differs from expectation for an engine operating condition indicates the heat exchanger performance has changed or if no change occurs the fuel-to-oil heat exchanger is performing as expected.

If the fuel-to-oil heat exchanger performance deteriorates potentially due to partial blockage or bypass, the change in temperature difference between un-cooled lubricant and heated coolant as a function of engine operating condition, would provide an indication of the health or performance of the heat exchanger. There is also the potential to diagnose if the relationship of the system to the engine operation condition has changed representing a means of checking the system performance.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A method of monitoring the performance of a fluid heat exchanger for use with an engine, the heat exchanger comprising a first fluid flow path therethrough, and a second fluid flow path therethrough, the method comprising the steps of:
   a) measuring a first temperature of a first fluid flowing through the first fluid flow path at an exit from the heat exchanger;
   b) measuring a second temperature of a second fluid flowing through the second fluid flow path at an entry to the heat exchanger;
   c) determining for the first and second temperature measurements, a temperature difference therebetween;
   d) comparing the temperature difference to a first threshold value indicative of a complete blockage of the first fluid flow path through the heat exchanger, the first threshold value being pre-determined based on a nominal fuel-to-oil heat exchanger performance and an analysis of the resultant performance of the fuel-to-oil heat exchanger due to blockage for a range of engine operating conditions; and e) if the temperature difference is greater than the first threshold value, generating a first alert signal to indicate a deterioration in the heat exchanger performance.

2. The method as claimed in claim 1, wherein the engine is a gas turbine engine.

3. The method as claimed in claim 1, wherein the first fluid flow path is a fuel flow path to the engine.

4. The method as claimed in claim 1, wherein the second fluid flow path is an oil flow path to the engine.

5. The method as claimed in claim 1, wherein the first threshold value is determined as a function of one or more of engine shaft speed, oil flow rate, fuel flow rate, gas path pressure, gas path temperature, engine thrust, and weight of fuel flowing to the engine.

6. The method as claimed in claim 1, wherein step d) comprises the step of:

d') comparing the temperature difference to a second threshold value indicative of a partial blockage of the first fluid flow path through the heat exchanger, the second threshold value being pre-determined based on a nominal fuel-to-oil heat exchanger performance and an analysis of the resultant performance of the fuel-to-oil heat exchanger due to blockage for a range of engine operating conditions; and step e) comprises the step of:

e') if the temperature difference is greater than the second threshold value, generating a second alert signal to indicate a deterioration in the heat exchanger performance.

7. The method as claimed in claim 6, wherein the second threshold value is determined as a function of one or more of engine shaft speed, oil flow rate, fuel flow rate, gas path pressure, gas path temperature, engine thrust, and weight of fuel flowing to the engine.

8. A system for monitoring the performance of a fluid heat exchanger for use with an engine, the heat exchanger comprising a first fluid flow path therethrough and a second fluid flow path therethrough, the system comprising:

a first temperature sensor positioned in the first fluid flow path at an exit from the heat exchanger;

a second temperature sensor positioned in the second fluid flow path at an entry to the heat exchanger;

a processor configured to receive a first temperature measurement value from the first temperature sensor, and a second temperature measurement value from the second temperature sensor, the processor being further configured to calculate a temperature difference between the first and second temperature measurement values; and an alert generator configured to generate an alert signal to a user, the alert signal being generated if the temperature difference is greater than a threshold value, wherein the threshold value is a first threshold value indicative of a complete blockage of the first fluid flow path through the heat exchanger, the first threshold value being pre-determined based on a nominal fuel-to-oil heat exchanger performance and an analysis of the resultant performance of the fuel-to-oil heat exchanger due to blockage for a range of engine operating conditions.

9. The system as claimed in claim 8, wherein the engine is a gas turbine engine.

10. The system as claimed in claim 8, wherein the first fluid flow path is a fuel flow path to the engine.

11. The system as claimed in claim 8, wherein the second fluid flow path is an oil flow path to the engine.

12. The system as claimed in claim 8, wherein the first threshold value is determined as a function of one or more of engine shaft speed, oil flow rate, fuel flow rate, gas path pressure, gas path temperature, engine thrust, and weight of fuel flowing to the engine.

13. A system for monitoring the performance of a fluid heat exchanger for use with an engine, the heat exchanger comprising a first fluid flow path therethrough and a second fluid flow path therethrough, the system comprising:

a first temperature sensor positioned in the first fluid flow path at an exit from the heat exchanger;

a second temperature sensor positioned in the second fluid flow path at an entry to the heat exchanger;

a processor configured to receive a first temperature measurement value from the first temperature sensor, and a second temperature measurement value from the second temperature sensor, the processor being further configured to calculate a temperature difference between the first and second temperature measurement values; and an alert generator configured to generate an alert signal to a user, the alert signal being generated if the temperature difference is greater than a threshold value, wherein the threshold value is a second threshold value indicative of a partial blockage of the first fluid flow path through the heat exchanger, the second threshold value being pre-determined based on a nominal fuel-to-oil heat exchanger performance and an analysis of the resultant performance of the fuel-to-oil heat exchanger due to blockage for a range of engine operating conditions.

14. The system as claimed in claim 13, wherein the second threshold value is determined as a function of one or more of engine shaft speed, oil flow rate, fuel flow rate, gas path pressure, gas path temperature, engine thrust, and weight of fuel flowing to the engine.

* * * * *